United States Patent

Sommer et al.

[11] 3,891,619
[45] June 24, 1975

[54] PHENYL-AZO-INDOLE COMPOUNDS

[75] Inventors: Richard Sommer; Manfred Wiesel; Hans-Günter Otten; Edgar Siegel, all of Leverkusen, Germany

[73] Assignee: Bayer Aktiengesellschaft, Leverkusen-Bayerwerk, Germany

[22] Filed: Dec. 1, 1972

[21] Appl. No.: 311,414

[30] Foreign Application Priority Data
Dec. 2, 1971 Germany.............................. 2159802

[52] U.S. Cl....... 260/165; 260/319.1; 260/326.13 R; 260/326.14 R; 260/326.15; 260/326.16; 260/507 R; 260/508; 260/509; 260/556 SN
[51] Int. Cl.......................... C09b 29/36; D06p 3/24
[58] Field of Search............................ 260/165, 152

[56] References Cited
UNITED STATES PATENTS

| | | | |
|---|---|---|---|
| 2,424,493 | 7/1947 | Muller et al..................... | 260/165 X |
| 3,255,173 | 6/1966 | Delnert et al................... | 260/165 X |

FOREIGN PATENTS OR APPLICATIONS

| | | | |
|---|---|---|---|
| 482,342 | 3/1938 | United Kingdom................ | 260/184 |
| 723,090 | 7/1942 | Germany............................ | 260/205 |

*Primary Examiner*—Floyd D. Higel
*Assistant Examiner*—C. F. Warren
*Attorney, Agent, or Firm*—Plumley & Tyner

[57] ABSTRACT

Monoazo dyestuffs which in the form of the free acid correspond to the general formula

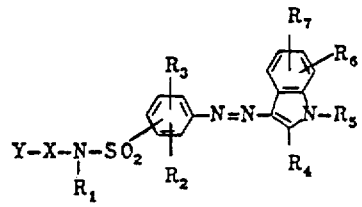

wherein $R_1$ is hydrogen or alkyl; $R_2$ is hydrogen, halogen, alkyl, alkoxy, nitro, nitrile, carbonamide or carboxylic acid ester; $R_3$ is hydrogen, halogen, alkyl or alkoxy; $R_4$ is alkyl or aryl; $R_5$ is hydrogen or alkyl, $R_6$ is hydrogen, halogen or alkyl; $R_7$ is hydrogen, halogen, alkyl, alkoxy or nitrile; X is $C_2$-$C_4$-alkylene, aralkylene or phenylene; Y is $SO_3H$ or, if X is phenylene, $SO_3H$ or a radical $—SO_2—NH—SO_2—R_8$; and $R_8$ is alkyl, aryl or dialkylamine. These dyestuffs are used for the dyeing of natural and synthetic fibre materials, especially for dyeing polyamide fibres. They yield level yellow to orange dyeings with very good fastness to light. Dyestuffs are absorbed well on polyamide fibres even in a neutral to weakly acid dyebath. The dyestuffs are employed in the form of the free acid or in the form of its salts, especially the alkali salts, such as the sodium or potassium salts or the ammonium salts.

4 Claims, No Drawings

PHENYL-AZO-INDOLE COMPOUNDS

The subject of the present invention are monoazo dyestuffs which in the form of the free acid correspond to the formula

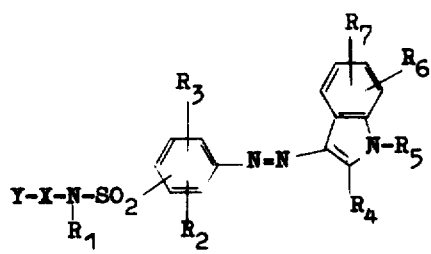

(I)

in which
- $R_1$ = hydrogen or alkyl,
- $R_2$ = hydrogen, halogen, alkyl, alkoxy, nitro, nitrile, carbonamide or carboxylic acid ester,
- $R_3$ = hydrogen, halogen, alkyl or alkoxy,
- $R_4$ = alkyl or aryl
- $R_5$ = hydrogen or alkyl,
- $R_6$ = hydrogen, halogen or alkyl,
- $R_7$ = hydrogen, halogen, alkyl, alkoxy or nitrile,
- X = $C_2$–$C_4$-alkylene, aralkylene or phenylene,
- Y = $SO_3H$ or, if X = phenylene, $SO_3H$ or a radical $-SO_2-NH-SO_2-R_x$ wherein
$R_x$ = alkyl, aryl or dialkylamine as well as their manufacture and use for dyeing natural and synthetic fibre materials.

The alkyl groups preferably contain 1 – 12 C atoms and can possess further subtituents, for example chlorine, bromine, nitrile, carbamoyl, alkoxy and alkoxycarbonyl.

Suitable alkyl groups $R_1$, $R_4$, $R_6$, $R_7$ and $R_x$ are, in particular, unsubstituted $C_1$–$C_4$-alkyl radicals, such as $CH_3$, $C_2H_5$, i—$C_3H_7$, n–$C_4H_9$ and i—$C_4H_9$.

Suitable alkyl groups $R_2$ and $R_3$ are, in particular, $C_1$–$C_4$-alkyl radicals, for example $CH_3$, $C_2H_5$, n- and iso-$C_3H_7$, and n-, sec.- and iso-$C_4H_9$ which can be substituted further, for example by chlorine, bromine, nitrile, carbamoyl, alkoxy, especially $C_1$–$C_4$-alkoxy, and alkoxycarbonyl, especially $C_1$–$C_4$-alkoxycarbonyl. Suitable halogen radicals are in particular chlorine, bromine and fluorine.

Suitable alkoxy radicals $R_2$, $R_3$ and $R_7$ are in, particular, those with 1 – 4 C atoms, for example —$OCH_3$, —$OC_2H_5$, —O—$C_3H_7$ and —O—$C_4H_9$.

Suitable alkyl radicals $R_5$ are in particular those with 1 – 4 C atoms which can be further substituted, for example by —CN, —$CONH_2$, $NH_2$ or —COOH, such as, for example, —$CH_3$, —$C_2H_5$, —$C_3H_7$, —$C_4H_9$, '$C_2H_4$CN, —$C_2H_4CONH_2$, —$C_2H_4COOCH$ and —$C_3H_6NH_2$.

Suitable aryl radicals $R_4$ are in particular phenyl or naphthyl radicals which are optionally substituted further, such as phenyl, biphenylyl or naphthyl.

Suitable aryl radicals $R_x$ are in particular optionally substituted phenyl radicals such as phenyl and $C_1$–$C_4$-alkylphenyl, especially methylphenyl.

Dimethylamino should be mentioned preferably as a suitable dialkylamino group $R_x$. Examples of suitable alkylene radicals X are —$CH_2CH_2$—,

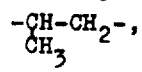

—$CH_2$—$CH_2$—$CH_2$—,

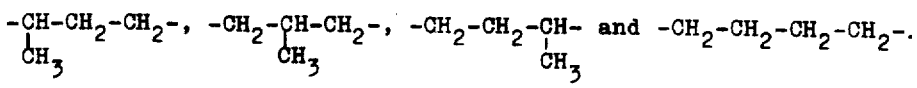

and —$CH_2$—$CG_2$—$CH_2$—$CH_2$—.

Examples of suitable aralkylene radicals X are

wherein
the benzene ring can optionally be substituted further. Examples of suitable phenylene radicals are 1,2-, 1,3- and 1,4-phenylene. The phenylene rings of the aralkylene and phenylene radicals can be substituted further, for example by alkyl, especially $C_1$–$C_4$-alkyl, such as $CH_3$—, $C_2H_5$— and $C_3H_7$—, or aralkyl, such as $C_6H_5$—$CH_2$—, by aryl, especially optionally substituted phenyl, by alkoxy, especially $C_1$–$C_4$-alkoxy, such as $CH_3O$— or $C_2H_5O$—, or aralkoxy, such as $C_6H_5$—$CH_2$—O—, by aryloxy, especially optionally substituted phenoxy, and also by chlorine, bromine, nitrile or nitro.

Within the framework of the formula (I), preferred dyestuffs are those which in the form of the free acid correspond to the formula

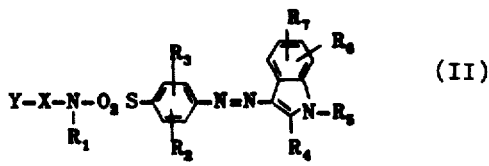

(II)

wherein
X, Y, $R_1$, $R_2$, $R_3$, $R_4$, $R_5$, $R_6$ and $R_7$ have the abovementioned meaning.

Particularly preferred dyestuffs are those which in the form of the free acid correspond to the formula

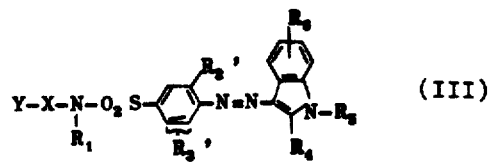

(III)

wherein
X, Y, $R_1$, $R_4$, $R_5$ and $R_6$ have the abovementioned meaning,
$R_2'$ represents hydrogen, chlorine or bromine and
$R_3'$ represents chlorine or bromine, especially those which in the form of the free acid correspond to the formula

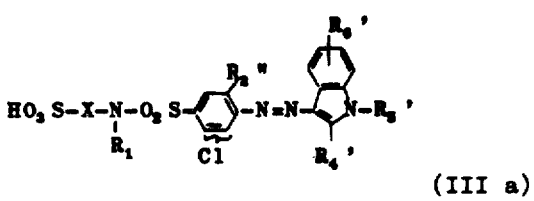

(III a)

wherein
R₁ and X have the abovementioned meaning,
R₂'' = hydrogen or chlorine,
R₄' = C₁–C₄-alkyl which is not substituted further, or phenyl,
R₅' 32 hydrogen or C₁–C₄-alkyl which is optionally substituted by amino, nitrile, carbonamide or carboxyl and
R₆' = hydrogen, chlorine or C₁–C₄-alkyl which is not substituted further.

The new dyestuffs of the formula (I) are obtained if amines of the general formula

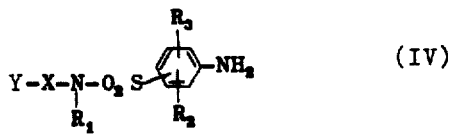
(IV)

wherein
R₁, R₂, R₃, Y and X have the abovementioned meaning are diazotised and combined with coupling components of the general formula

(V)

wherein
R₄, R₅, R₆ and R₇ have the abovementioned meaning.

Examples of suitable amines of the formula IV are: N-(4-amino-phenyl-sulphonyl)-2-amino-ethane-sulphonic acid, N-methyl-N-(4-amino-phenyl-sulphonyl)-2-amino-ethane-sulphonic acid, N-propyl-N-(4-amino-phenyl-sulphonyl)-2-amino-ethane-sulphonic acid, N-(4-amino-2-chloro-phenyl-sulphonyl)-2-amino-ethane-sulphonic acid, N-ethyl-N-(4-amino-2-chloro-phenyl-sulphonyl)-2-amino-ethane-sulphonic acid, N-(4-amino-3-chloro-phenyl-sulphonyl)-2-amino-ethane-sulphonic acid, N-methyl-N-(4-amino-3-chloro-phenyl-sulphonyl)-2-amino-ethane-sulphonic acid, N-ethyl-N-(4-amino-3-chloro-phenyl-sulphonyl)-2-amino-ethane-sulphonic acid, N-(4-amino-2,5-dichloro-phenyl-sulphonyl)-2-amino-ethane-sulphonic acid, N-methyl-N-(4-amino-2,5-dichloro-phenyl-sulphonyl)-2-amino-ethane-sulphonic acid, N-ethyl-N-(4-amino-2,5-dichloro-phenyl-sulphonyl)-2-amino-ethane-sulphonic acid, N-propyl-N-(4-amino-2,5-dichloro-phenyl-sulphonyl)-2-amino-ethane-sulphonic acid, N-(4-amino-3,5-dichloro-phenyl-sulphonyl)-2-amino-ethane-sulphonic acid, N-methyl-N-(4-amino-3,5-dichloro-phenyl-sulphonyl)-2-amino-ethane-sulphonic acid, N-(4-amino-3-methyl-phenyl-sulphonyl)-2-amino-ethane-sulphonic acid, N-(4-amino-3-methoxy-phenyl-sulphonyl)-2-amino-ethane-sulphonic acid, N-methyl-N-(4-amino-3-methoxy-phenyl-sulphonyl)-2-amino-ethane-sulphonic acid, N-(4-amino-3-ethoxy-phenyl-sulphonyl)-2-amino-ethane-sulphonic acid, N-(4-amino-3-trifluoromethyl-phenyl-sulphonyl)-2-amino-ethane-sulphonic acid, N-methyl-N-(4-amino-3-trifluoromethyl-phenyl-sulphonyl)-2-amino-ethane-sulphonic acid, N-propyl-N-(4-amino-3-trifluoromethyl-phenyl-sulphonyl)-2-amino-ethane-sulphonic acid, N-(4-amino-phenyl-sulphonyl)-3-amino-propyl-sulphonic acid, N-methyl-N-(4-amino-phenyl-sulphonyl)-3-amino-propyl-sulphonic acid, N-(4-amino-2-chloro-phenyl-sulphonyl)-3-amino-propyl-sulphonic acid, N-ethyl-N-(4-amino-3-chloro-phenyl-sulphonyl)-3-amino-propyl-sulphonic acid, N-(4-amino-2,5-dichloro-phenyl-sulphonyl)-3-amino-propyl-sulphonic acid, N-methyl-N-(4-amino-2,5-dichloro-phenyl-sulphonyl)-3-amino-propyl-sulphonic acid, N-(4-amino-3,5-dichloro-phenyl-sulphonyl)-3-amino-propyl-sulphonic acid, N-methyl-N-(4-amino-3,5-dichloro-phenyl-sulphonyl)-3-amino-propyl-sulphonic acid, N-propyl-N-(4-amino-3,5-dichloro-phenyl-sulphonyl)-3-amino-propyl-sulphonic acid, N-methyl-N-(4-amino-3-methyl-phenyl-sulphonyl)-3-amino-propyl-sulphonic acid, N-(4-amino-3-trifluoromethyl-phenyl-sulphonyl)-3-amino-propyl-sulphonic acid, N-(4-amino-phenyl-sulphonyl)-3-amino-butyl-sulphonic acid, N-(4-amino-2,5-dichloro-phenyl-sulphonyl)-3-amino-butyl-sulphonic acid, N-methyl-N-(4-amino-2,5-dichloro-phenyl-sulphonyl)-3-amino-butyl-sulphonic acid, N-(4-amino-3,5-dichloro-phenyl-sulphonyl)-3-amino-butyl-sulphonic acid, N-methyl-N-(4-amino-3,5-dichloro-phenyl-sulphonyl)-3-amino-butyl-sulphonic acid, N-ethyl-N-(4-amino-3,5-dichloro-phenyl-sulphonyl)-3-amino-butyl-sulphonic acid, N-ethyl-N-(4-amino-3-methyl-phenyl-sulphonyl)-3-amino-butyl-sulphonic acid, N-methyl-N-(4-amino-3-methoxy-phenyl-sulphonyl)-3-amino-butyl-sulphonic acid, N-(4-amino-3-trifluoromethyl-phenyl-sulphonyl)-3-amino-butyl-sulphonic acid, N-methyl-N-(4-amino-3-trifluoromethyl-phenyl-sulphonyl)-3-amino-butyl-sulphonic acid, N-(4-amino-phenyl-sulphonyl)-4-amino-butyl-sulphonic acid, N-methyl-N-(4-amino-phenyl-sulphonyl)-4-amino-butyl-sulphonic acid, N-(4-amino-2-chloro-phenyl-sulphonyl)-4-amino-butyl-sulphonic acid, N-(4-amino-3-chloro-phenyl-sulphonyl)-4-amino-butyl-sulphonic acid, N-(4-amino-2,5-dichloro-phenyl-sulphonyl)-4-amino-butyl-sulphonic acid, N-methyl-N-(4-amino-2,5-dichloro-phenyl-sulphonyl)-4-amino-butyl-sulphonic acid, N-(4-amino-3,5-dichloro-phenyl-sulphonyl)-4-amino-butyl-sulphonic acid, N-(4-amino-3-trifluoromethyl-phenyl-sulphonyl)-4-amino-butyl-sulphonic acid, N-methyl-N-(4-amino-3-trifluoromethyl-phenyl-sulphonyl)-4-amino-butyl-sulphonic acid, N-(4-amino-phenyl-sulphonyl)-3-amino-phenyl-sulphonic acid, N-methyl-N-(4-amino-2-chloro-phenyl-sulphonyl)-3-amino-phenyl-sulphonic acid, N-ethyl-N-(4-amino-3-chloro-phenyl-sulphonyl)-3-amino-phenyl-sulphonic acid, N-(4-amino-2,5-dichloro-phenyl-sulphonyl)-3-amino-phenyl-sulphonic acid, N-methyl-N-(4-amino-2,5-dichloro-phenyl-sulphonyl)-3-amino-phenyl-sulphonic acid, N-methyl-N-(4-amino-3,5-dichloro-phenyl-sulphonyl)-3-amino-phenyl-sulphonic acid, N-propyl-N-(4-amino-3,5-dichloro-phenyl-sulphonyl-3-amino-phenyl-sulphonic acid, N-(4-amino-3-methyl-phenyl-sulphonyl)-3-amino-phenyl-sulphonic acid, N-(4-amino-3-methoxy-phenyl-sulphonyl)-3-amino-phenyl-sulphonic acid, N-(4-amino-3-trifluoromethyl-phenyl-sulphonyl)-3-amino-phenyl-sulphonic acid, N-(4-amino-phenyl-sulphonyl)-4-amino-phenyl-sulphonic acid, N-(4-amino-2-chloro-phenyl-sulphonyl)-4-amino-phenyl-sulphonic acid, N-methyl-N-(4-amino-3-chloro-phenyl-sulphonyl)-4-amino-phenyl-sulphonic acid, N-(4-amino-2,5-dichloro-phenyl-sulphonyl)-4-amino-phenyl-sulphonic acid, N-methyl-N-(4-amino- 2,5-dichloro-phenyl-sulphonyl)-4-amino-phenyl-sulphonic acid, N-ethyl-N-(4-amino-2,5-dichloro-phenyl-sulphonyl)-4-amino-phenyl-sulphonic acid, N-methyl-N-( 4-amino-3,5-dichloro-phenyl-sulphonyl)-4-amino-phenyl-sulphonic acid, N-(4-amino-3-methyl-phenyl-sulphonyl)-4-amino-phenyl-sulphonic acid, N-(4-amino-3-methoxy-phenyl-sulphonyl)-4-amino-phenyl-sulphonic acid, N-(4-amino-3-trifluoromethyl-phenyl-sulphonyl)-4-amino-phenyl-sulphonic acid, N-(4-amino-phenyl-sulphonyl)-3-amino-phenylmethane-sulphonic acid, N-ethyl-N-(4-amino-phenyl-sulphonyl)-3-amino-phenylmethane-sulphonic acid, N-(4-amino-2-chloro-phenyl-sulphonyl)-3-amino-phenylmethane-sulphonic acid, N-(4-amino-3-chloro-phenyl-sulphonyl)-3-amino-phenylmethane-sulphonic acid, N-(4-amino-2,5-dichloro-phenyl-sulphonyl)-3-amino-phenylmethane-sulphonic acid, N-methyl-N-(4-amino-2,5-dichloro-phenyl-sulphonyl)-3-amino-phenylmethane-sulphonic acid, N-ethyl-N-(4-amino-2,5-dichloro-phenyl-sulphonyl)-3-amino-phenylmethane-sulphonic acid, N-methyl-N-(4-amino-3,5-dichloro-phenyl-sulphonyl)-3-amino-phenylmethane-sulphonic acid, N-(4-amino-3-trifluoromethyl-phenyl-sulphonyl)-3-amino-phenylmethane-sulphonic acid, N-(4-amino-phenyl-sulphonyl)-4-amino-phenyl-methane-sulphonic acid, N-(4-amino-2,5-dichloro-phenyl-sulphonyl)-4-amino-phenylmethane-sulphonic acid, N-methyl-N-(4-amino-2,5-dichloro-phenyl-sulphonyl)-4-amino-phenyl-methane-sulphonic acid, N-(4-amino-3-ethoxy-phenyl-sulphonyl)-4-amino-phenylmethane-sulphonic acid, N-(4-amino-3-trifluoro-methyl-phenyl-sulphonyl)-4-amino-phenylmethane-sulphonic acid, N-(4-amino-2-chloro-phenyl-sulphonyl)-3-amino-4-methyl-phenyl-sulphonic acid, N-(4-amino-3-chloro-phenyl-sulphonyl)-3-amino-4-methyl-phenyl-sulphonic acid, N-(4-amino-2,5-dichloro-phenyl-sulphonyl)-3-amino-4-methyl-phenyl-sulphonic acid, N-methyl-N-(4-amino-2,5-dichloro-phenyl-sulphonyl)-3-amino-4-methyl-phenyl-sulphonic acid, N-ethyl-N-(4-amino-2,5-dichloro-phenyl-sulphonyl)-3-amino-4-methyl-phenyl-sulphonic acid, N-(4-amino-3,5-dichloro-phenyl-sulphonyl)-3-amino-4-methyl-phenyl-sulphonic acid, N-(4-amino-3-trifluoromethyl-phenyl-sulphonyl)-3-amino-4-methyl-phenyl-sulphonic acid, N-(4-amino-phenyl-sulphonyl)-4-amino-3-methyl-phenyl-sulphonic acid, N-(4-amino-2,5-dichloro-phenyl-sulphonyl)-4-amino-3-methyl-phenyl-sulphonic acid, N-(4-amino-3-trifluoromethyl-phenyl-sulphonyl)-4-amino-3-methyl-phenyl-sulphonic acid, N-(4-amino-phenyl-sulphonyl)-3-amino-4-methoxy-phenyl-sulphonic acid, N-(4-amino-2,5-dichloro-phenyl-sulphonyl)-3-amino-4-methoxy-phenyl-sulphonic acid, N-(4-amino-3,5-dichloro-phenyl-sulphonyl)-3-amino-4-methoxy-phenyl-sulphonic acid, N-(4-amino-3-trifluoromethyl-phenyl-sulphonyl)-3-amino-4-methoxy-phenyl-sulphonic acid, N-(4-amino-2-chloro-phenyl-sulphonyl)-4-amino-3-methoxy-phenyl-sulphonic acid, N-(4-amino-3-methyl-phenyl-sulphonyl)-4-amino-3-methoxy-phenyl-sulphonic acid, N-(4-amino-3-methoxy-phenyl-sulphonyl)-4-amino-3-methoxy-phenyl-sulphonic acid, N-(4-amino-2-chlorophenyl-sulphonyl)-5-amino-2-methoxy-phenyl-sulphonic acid, N-(4-amino-2,5-dichloro-phenyl-sulphonyl)-5-amino-2-methoxyphenyl-sulphonic acid, N-methyl-N-(4-amino-2,5-dichlorophenyl-sulphonyl)-5-amino-2-methoxy-phenyl-sulphonic acid, N-(4-amino-2,5-dichloro-phenyl-sulphonyl)-5-amino-2-ethoxyphenyl-sulphonic acid, N-methyl-N-(4-amino-2,5-dichlorophenyl-sulphonyl)-5-amino-2-ethoxy-phenyl-sulphonic acid. N-(4-amino-phenyl-sulphonyl)-5-amino-2-phenoxy-phenyl-sulphonic acid, N-methyl-N-(4-amino-3-chloro-phenyl-sulphonyl)-5-amino-2-phenoxy-phenyl-sulphonic acid, N-(4-amino-2,5-dichloro-phenyl-sulphonyl)-5-amino-2-phenoxy-phenyl-sulphonic acid, N-methyl-N-(4-amino-2,5-dichloro-phenyl-sulphonyl)-5-amino-2-phenoxy-phenyl-sulphonic acid, N-(4-amino-3,5-dichloro-phenyl-sulphonyl)-5-amino-2-phenoxy-phenyl-sulphonic acid, N-ethyl-N-(4-amino-3,5-dichloro-phenyl-sulphonyl)-5-amino-2-phenoxy-phenyl-sulphonic acid, N-(4-amino-3-trifluoromethyl-phenyl-sulphonyl)-5 -amino-2-phenoxy-phenyl-sulphonic acid, N-methyl-N-(4-amino-phenyl-sulphonyl)-3-amino-4-chloro-phenyl-sulphonic acid, N-(4-amino-2,5-dichloro-phenyl-sulphonyl)-3-amino-4-chloro-phenyl-sulphonic acid, N-(4-amino-2,5-dichloro-phenyl-sulphonyl)-4-amino-3-chloro-phenyl-sulphonic acid, N-(4-amino-phenyl-sulphonyl-3-amino-methane-phenyl-sulphonic acid, N-(4-amino-2-chloro-phenyl-sulphonyl)-3-amino-methane-phenyl-sulphonic acid, N-(4-amino-2,5-dichloro-phenyl-sulphonyl)-3-amino-methane-phenyl-sulphonic acid, N-methyl-N-(4-amino-2,5-dichlorophenyl-sulphonyl)-3-amino-methane-phenyl-sulphonic acid, N-(4-amino-3-trifluoromethyl-phenyl-sulphonyl)-3-amino-methane-phenyl-sulphonic acid, N-ethyl-N-(4-amino-phenyl-sulphonyl)-4-amino-methane-phenyl-sulphonic acid, N-(4-amino-2,5-dichloro-phenyl-sulphonyl)-4-amino-methane-phenyl-sulphonic acid, N-methyl-N-(4-amino-2,5-dichloro-phenyl-sulphonyl)-4-amino-methane-phenyl-sulphonic acid, N-(4-amino-3-trifluoromethylphenyl-sulphonyl)-4-amino-methane-phenyl-sulphonic acid, [N-(4-amino-2,5-dichloro-phenyl-sulphonyl)-4-amino-phenyl]-sulphonyl-phenylsulphonamide, [N-(4-amino-2,5-dichloro-phenylsulphonyl)-4-amino-phenyl]-sulphonyl-methylsulphonamide, [N-(4-amino-2,5-dichloro-phenyl-sulphonyl)-3-amino-phenyl]-sulphonyl-phenylsulphonamide, [N-(4-amino-2,5-dichlorophenyl-sulphonyl)-3-amino-phenyl]-sulphonyl-butylsulphonamide and [N-(4-amino-2,5-dichloro-phenyl-sulphonyl)-2-amino-phenyl -sulphonyl-p-tolylsulphonamide.

The diazo components of the general formula (IV) are obtained by amidising acetylaminobenzenesulphochlorides or nitrobenzenesulphochlorides with amines of the formula

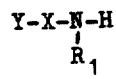

wherein

X, Y and $R_1$ have the indicated meaning
and splitting off the acetyl group or converting the nitro group into the amino group by reduction.

Diazo components of the general formula (IV), in which

X represents phenylene and
Y represents a $-SO_2-NH-SO_2-R_x$ radical,
wherein
$R_x$ has the abovementioned meaning are obtained analogously by reaction of the abovementioned acetylaminobenzenesulphochlorides or nitrobenzenesulphochlorides with the amines of the formula

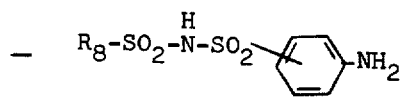

which are known from the literature, followed by splitting off of the acetyl group or reduction of the nitro group.

Examples of suitable coupling components of the formula (V) are: 2-methyl-indole, 2-phenyl-indole, 1-methyl-2-phenyl-indole, 1,2-dimethyl-indole, 1-β-cyanoethyl-2-methylindole, 1-β-cyanoethyl-2-phenyl-indole, β-(2-phenyl-indolyl-1)-propionic acid amide, β-(2-methyl-indolyl-1)-propionic acid amide, 1-(γ-aminopropyl)-2phenyl-indole, β-(2-methyl-indolyl-1)-propionic acid, 2-β-naphthyl-indole, 2-p-biphenylyl-indole, 2,5-dimethyl-indole, 2,4-dimethyl-7-methoxy-indole, 2-phenyl-5-ethoxy-indole, 2-methyl-5-ethoxy-indole, 2-methyl-5-chloroindole, 2-methyl-6-chloro-indole, 2-methyl-5-nitro-indole, 2-methyl-5cyano-indole, 2-methyl-7-chloro-indole, 2-methyl-5-fluoro-indole, 2-methyl-5-bromo-indole, 2-methyl-5,7-dichloro-indole and 1β-cyanoethyl-2,6-dimethyl-indole.

The dyestuffs according to the invention are suitable for dyeing natural and synthetic fibre materials, especially for dyeing polyamide fibres. They yield level yellow to orange dyeings of good yield and very good fastness to light. They are absorbed well on polyamide fibres even in a neutral to weakly acid dyebath. By polyamide fibres there are here understood especially those of synthetic polyamides such as ε-polycaprolactam or condensation products of adipic acid and hexamethylenediamine. The dyestuffs are employed in the form of the free acid or in the form of its salts, especially the alkali salts, such as the sodium or potassium salts or the ammonium salts. The formulae given above are those of the free acids.

In the examples which follow, parts denote parts by weight.

EXAMPLE 1

34.9 parts of N-(4-amino-2,5-dichloro-phenyl-sulphonyl)-amino-ethanesulphonic acid are dissolved in 200 parts of water by means of sodium hydroxide solution, at pH 7, 7.0 parts of sodium nitrite are added, after cooling to 5°C 30 parts of hydrochloric acid (37% strength) are added and diazotisation is carried out for 15 minutes at 0° – 5°C. Thereafter a solution of 19.3 parts of 2-phenyl-indole in glacial acetic acid is added to the clear diazo solution and the coupling which immediately starts is completed by adding sodium acetate. The dyestuff which precipitates, which in the form of the free acid corresponds to the formula

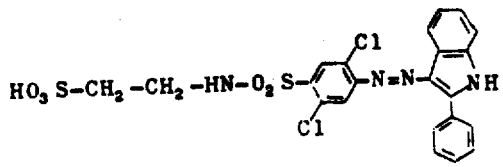

is filtered off and dried. It dyes polyamide fibres and polyamide fabrics, from a weakly acid or neutral bath, in a yellowish-tinged orange of very good fastness to light.

If the procedure indicated in Example 1 is followed but the compounds listed in the table which follows are employed as the diazo component and as the coupling component, valuable water-soluble monoazo dyestuffs are again obtained, which dye polyamide in yellow to orange light-fast shades.

Table

| Example | Diazo Component | Coupling Component |
|---|---|---|
| 2 | HO₃S—CH₂CH₂—NH—O₂S-(2,5-Cl₂-C₆H₂)-NH₂ | 1-Methyl-2-phenyl-indole |
| 3 | " | 2-Methyl-indole |
| 4 | " | 1,2-Dimethyl-indole |
| 5 | " | 1-β-Cyanoethyl-2-phenyl-indole |
| 6 | " | 2,6-Dimethyl-indole |
| 7 | " | β-(2-Phenylindolyl-1)-propionic acid amide |
| 8 | " | 2-Methyl-5-chloro-indole |
| 9 | " | 2-Methyl-7-chloro-indole |
| 10 | HO₃S—CH₂CH₂—N(CH₃)—O₂S-(2,5-Cl₂-C₆H₂)-NH₂ | 1-Phenyl-indole |
| 11 | " | 1-Methyl-2-phenyl-indole |
| 12 | " | 2-Methyl-indole |
| 13 | " | 1-β-Cyanoethyl-2-phenyl-indole |
| 14 | HO₃S—CH₂CH₂CH₂—NH—O₂S-(2,5-Cl₂-C₆H₂)-NH₂ | 2-Methyl-5-chloro-indole |
| 15 | " | 1-Methyl-2-phenyl-indole |

Table

| Example | Diazo Component | Coupling Component |
|---|---|---|
| 16 | HO₃S—CH₂CH₂CH₂—NH—O₂S—[2,6-Cl₂-phenyl]-NH₂ | 2-Phenyl-indole |
| 17 | " | 2-Methyl-indole |
| 18 | " | 1-β-Cyanoethyl-2-phenyl-indole |
| 19 | " | 2-Methyl-7-chloro-indole |
| 20 | " | 1,2-Dimethyl-indole |
| 21 | " | 2-Methyl-5-cyano-indole |
| 22 | HO₃S—CH₂CH₂CH₂—N(CH₃)—O₂S—[2,6-Cl₂-phenyl]-NH₂ | 2-Phenyl-indole |
| 23 | " | 1-Methyl-2-phenyl-indole |
| 24 | " | 1-β-Cyanoethyl-2-phenyl-indole |
| 25 | HO₃S—CH₂CH₂—N(C₄H₉)—O₂S—[2,5-Cl₂-phenyl]-NH₂ | 2-Phenyl-indole |
| 26 | " | 1-Methyl-2-phenyl-indole |
| 27 | " | 2,6-Dimethyl-indole |
| 28 | HO₃S—(CH₂)₄—NH—O₂S—[2,6-Cl₂-phenyl]-NH₂ | 1-Methyl-2-phenyl-indole |
| 29 | " | 2-Phenyl-indole |
| 30 | " | 2-Methyl-indole |
| 31 | " | 1-β-Cyanoethyl-2-phenyl-indole |
| 32 | " | 2-Phenyl-5-ethoxy-indole |
| 33 | HO₃S—CH(CH₃)—CH₂CH₂—NH—O₂S—[2,6-Cl₂-phenyl]-NH₂ | 2-Phenyl-indole |
| 34 | " | 1-Methyl-2-phenyl-indole |
| 35 | " | 1-β-Cyanoethyl-2-phenyl-indole |
| 36 | HO₃S—CH₂CH₂CH₂—N(C₂H₅)—O₂S—[2,6-Cl₂-phenyl]-NH₂ | 2-Phenyl-indole |
| 37 | " | 1-Methyl-2-phenyl-indole |
| 38 | " | 2-Methyl-indole |
| 39 | " | 1-β-Cyanoethyl-2-phenyl-indole |
| 40 | HO₃S—CH₂CH₂—NH—O₂S—[2,6-Cl₂-phenyl]-NH₂ | 1-Methyl-2-phenyl-indole |

Table

| Example | Diazo Component | Coupling Component |
|---|---|---|
| 41 | " | 1-β-Cyanoethyl-2-phenyl-indole |
| 42 | " | 1,2-Dimethyl-indole |
| 43 | " | 2-Methyl-5-cyano-indole |
| 44 | " | β-(2-Phenylindolyl-1)-propionic acid amide |
| 45 | " | 2-Methyl-5-chloro-indole |
| 46 | HO₃S—CH₂CH₂—HN—O₂S—C₆H₂(Cl)₂—NH₂ (2,6-dichloro-4-sulfonamido aniline) | 2-Methyl-7-chloro-indole |
| 47 | HO₃S—CH₂CH₂—HN—O₂S—C₆H₂(Cl)₂—NH₂ | 2,5-Dimethyl-indole |
| 48 | HO₃S—CH₂CH₂—N(CH₃)—O₂S—C₆H₂(Cl)₂—NH₂ | 1-Methyl-2-phenyl-indole |
| 49 | " | 2-Phenyl-indole |
| 50 | " | 2-Methyl-indole |
| 51 | " | 2-Methyl-6-chloro-indole |
| 52 | " | 1-β-Cyanoethyl-2-phenyl-indole |
| 53 | HO₃S—CH₂CH₂—N(C₂H₅)—O₂S—C₆H₂(Cl)₂—NH₂ | 2-Phenyl-indole |
| 54 | " | 2-Methyl-indole |
| 55 | " | 1-Methyl-2-phenyl-indole |
| 56 | " | 1-β-Cyanoethyl-2-phenyl-indole |
| 57 | HO₃S—CH₂CH₂CH₂—NH—O₂S—C₆H₂(Cl)₂—NH₂ | 2-Phenyl-indole |
| 58 | " | 2-Methyl-indole |
| 59 | HO₃S—CH₂CH₂CH₂CH₂—NH—O₂S—C₆H₂(Cl)₂—NH₂ | 2-Phenyl-indole |
| 60 | " | 2-Methyl-indole |
| 61 | " | 2,5-Dimethyl-indole |
| 62 | HO₃S—CH₂CH₂CH₂CH₂—NH—O₂S—C₆H₂(Cl)₂—NH₂ | 2-Methyl-5-chloro-indole |
| 63 | " | 1-β-Cyanoethyl-2-phenyl-indole |
| 64 | 3-SO₃H-C₆H₄—NH—O₂S—C₆H₂(Cl)₂—NH₂ | 2-Methyl-indole |
| 65 | " | 2-Phenyl-indole |
| 66 | " | 1-Methyl-2-phenyl-indole |

| Example | Diazo Component | Coupling Component |
|---|---|---|
| 67 | HO₃S—⌬—NH—O₂S—(2,5-Cl₂-4-NH₂-C₆H₂)— | 1-β-Cyanoethyl-2-phenyl-indole |
| 68 | " | 2,5-Dimethyl-indole |
| 69 | " | 2-Methyl-indole |
| 70 | " | 2-Phenyl-indole |
| 71 | " | 2-Methyl-5-chloro-indole |
| 72 | 2-HO₃S-C₆H₄-NH—O₂S—(2,5-Cl₂-4-NH₂-C₆H₂)— | 2-Phenyl-indole |
| 73 | " | 2-Methyl-indole |
| 74 | " | 1-β-Cyanoethyl-2-phenyl-indole |
| 75 | 3-(CH₂SO₃H)-C₆H₄-NH—O₂S—(2,5-Cl₂-4-NH₂-C₆H₂)— | 2-Methyl-indole |
| 76 | 3-(CH₂SO₃H)-C₆H₄-NH—O₂S—(2,5-Cl₂-4-NH₂-C₆H₂)— | 2-Phenyl-indole |
| 77 | " | 2-Methyl-6-chloro-indole |
| 78 | " | 1-Methyl-2-phenyl-indole |
| 79 | " | β-(2-Phenylindolyl-1)-propionic acid amide |
| 80 | " | 1-β-Cyanoethyl-2-phenyl-indole |
| 81 | C₂H₅-O-C₆H₃(SO₃H)-NH—O₂S—(2,5-Cl₂-4-NH₂-C₆H₂)— | 2-Methyl-indole |
| 82 | " | 2-Phenyl-indole |
| 83 | " | 2,5-Dimethyl-indole |
| 84 | HO₃S-CH₂-C₆H₄-NH—O₂S—(2,5-Cl₂-4-NH₂-C₆H₂)— | 2-Methyl-indole |
| 85 | " | 2-Phenyl-indole |
| 86 | " | 2-Methyl-5-chloro-indole |
| 87 | SO₃H-C₆H₄-NH—O₂S—(2,6-Cl₂-4-NH₂-C₆H₂)— | 2-Phenyl-indole |
| 88 | " | 2-Methyl-indole |
| 89 | " | 1-Methyl-2-phenyl-indole |
| 90 | HO₃S-C₆H₄-NH—O₂S—(2,6-Cl₂-4-NH₂-C₆H₂)— | 1-β-Cyanoethyl-2-phenyl-indole |
| 91 | " | 2-Methyl-indole |
| 92 | " | 2,5-Dimethyl-indole |
| 93 | HO₃S-CH₂-C₆H₄-NH-SO₂-(4-NH₂-3-Cl-C₆H₃)— | 2-Methyl-indole |

Table

| Example | Diazo Component | Coupling Component |
|---|---|---|
| 94 | '' | 2-Phenyl-indole |
| 95 | '' | 2-Methyl-5-chloro-indole |
| 96 | HO₃S-CH₂-⟨⟩-NH-SO₂-⟨Cl,Cl⟩-NH₂ | 1-Methyl-2-phenyl indole |
| 97 | '' | 2-Methyl-indole |
| 98 | '' | 1-β-Cyanoethyl-2-methyl-indole |
| 99 | HO₃S-CH₂-⟨⟩-NH-SO₂-⟨⟩-NH₂ | 2-Phenyl-indole |
| 100 | '' | 2-Methyl-indole |
| 101 | '' | 2,5-Dimethyl-indole |
| 102 | HO₃S-CH₂-⟨CH₃⟩-NH-SO₂-⟨CF₃⟩-NH₂ | 2-Methyl-indole |
| 103 | '' | 2-Phenyl-indole |
| 104 | '' | 2-Methyl-5-chloro-indole |
| 105 | ⟨Cl, CH₂-SO₃H⟩-NH-SO₂-⟨OCH₃⟩-NH₂ | 2-Phenyl-indole |
| 106 | '' | 1-Methyl-2-phenyl-indole |
| 107 | '' | 2-Methyl-6-chloro-indole |
| 108 | C₂H₅-O-⟨SO₃H⟩-NH-SO₂-⟨Cl⟩-NH₂ | 2-Methyl-indole |
| 109 | '' | 2-Phenyl-indole |
| 110 | '' | 2,5-Dimethyl-indole |
| 111 | '' | 1-Methyl-2-phenyl-indole |
| 112 | ⟨⟩-SO₂-N(H)-O₂S-⟨⟩-N(H)-O₂S-⟨Cl,Cl⟩-NH₂ | 2-Methyl-indole |
| 113 | '' | 2-Phenyl-indole |
| 114 | '' | 1-β-Cyanoethyl-2-phenyl-indole |
| 115 | ⟨⟩-SO₂-N(H)-O₂S-⟨⟩-N(H)-O₂S-⟨Cl,Cl⟩-NH₂ | 2-Phenyl-indole |
| 116 | '' | 2-Methyl-indole |
| 117 | '' | 2-Methyl-5-chloro-indole |
| 118 | CH₃-SO₂-N(H)-O₂S-⟨⟩-N(H)-O₂S-⟨Cl,Cl⟩-NH₂ | 2-Methyl-indole |
| 119 | CH₃-SO₂-N(H)-O₂S-⟨⟩-N(H)-C₂S-⟨Cl,Cl⟩-NH₂ | 2-Phenyl-indole |
| 120 | '' | 2,5-Dimethyl-indole |
| 121 | CH₃-SO₂-N(H)-O₂S-⟨⟩-N(H)-O₂S-⟨Cl,Cl⟩-NH | 2-Methyl-indole |

Table

| Example | Diazo Component | Coupling Component |
|---|---|---|
| 122 | CH₃—SO₂—NH—O₂S—⟨C₆H₄⟩—NH—O₂S—⟨C₆H₃(Cl)₂⟩—NH₂ | 2-Methyl-indole |
| 123 | " | 2-Phenyl-indole |
| 124 | CH₃—SO₂—NH—O₂S—⟨C₆H₄⟩—NH—O₂S—⟨C₆H₃(Cl)₂⟩—NH₂ | 1-β-Cyanoethyl-2-phenyl-indole |
| 125 | " | 1-Methyl-2-phenyl-indole |
| 126 | C₄H₉—SO₂—NH—O₂S—⟨C₆H₄⟩—NH—O₂S—⟨C₆H₃(Cl)₂⟩—NH₂ | 1-Methyl-2-phenyl-5-chloro-indole |
| 127 | " | 2-Methyl-indole |
| 128 | C₄H₉—SO₂—NH—O₂S—⟨C₆H₄⟩—NH—O₂S—⟨C₆H₃(Cl)₂⟩—NH₂ | 2,5-Dimethyl-indole |
| 129 | " | 2-Methyl-indole |
| 130 | ⟨C₆H₅⟩—SO₂—NH—SO₂—⟨C₆H₄⟩—NH—O₂S—⟨C₆H₃(Cl)₂⟩—NH₂ | 2-Methyl-indole |
| 131 | ⟨C₆H₅⟩—SO₂—NH—SO₂—⟨C₆H₄⟩—NH—O₂S—⟨C₆H₃(Cl)₂⟩—NH₂ | 2-Phenyl-indole |
| 132 | HO₃S—CH₂CH₂—NH—O₂S—⟨C₆H₃(CF₃)⟩—NH₂ | 2-Methyl-indole |
| 133 | " | 2-Phenyl-indole |
| 134 | " | 1,2-Dimethyl-indole |
| 135 | " | 1-Ethyl-2,5-dimethyl-indole |
| 136 | HO₃S—CH₂CH₂—NH—O₂S—⟨C₆H₃(Cl)⟩—NH₂ | 1-Ethyl-2-methyl-indole |
| 137 | " | 2-Methyl-indole |

EXAMPLE 138

Preparation of N-(4-amino-2,5-dichlorophenylsulphonyl)-amino-ethane-sulphonic acid.

The diazo component used in Example 1 is prepared as follows: 130 parts of 2,5-dichloro-4-acetylaminobenzene-sulphochloride are introduced into 750 parts of a 15 – 20% strength aqueous taurine solution at 0°C and the mixture is further stirred for 3 hours at 0°C and one hour at 80°C. Thereafter, concentrated hydrochloric acid is added in the cold until the product precipitates, and the colourless product is filtered off.

We claim:

1. Monoazo dyestuff which in the form of the free acid corresponds to the formula

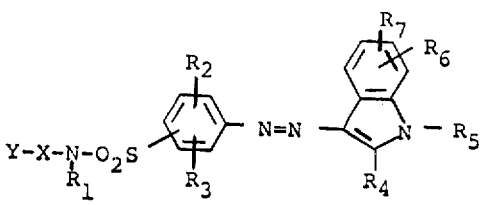

wherein
$R_1$ is hydrogen or $C_1$–$C_4$-alkyl;
$R_2$ is hydrogen, chloro, bromo, trifluoromethyl, nitro, cyano, carbonamido, $C_1$–$C_4$-alkoxy, $C_1$–$C_4$-alkyl, or $C_1$–$C_4$-alkyl substituted by chloro, bromo, cyano, carbamoyl, $C_1$–$C_4$-alkoxy, or alkoxycarbonyl of 1–4 carbon atoms in the alkoxy portion;

$R_3$ is hydrogen, chloro, bromo, $C_1$–$C_4$-alkoxy, $C_1$–$C_4$-alkyl, or $C_1$–$C_4$-alkyl substituted by chloro, bromo, cyano, carbamoyl, $C_1$–$C_4$-alkoxy, or alkoxycarbonyl of 1–4 carbon atoms in the alkoxy portion;

$R_4$ is $C_1$–$C_4$-alkyl, phenyl, biphenylyl, naphthyl;

$R_5$ is hydrogen, $C_1$–$C_4$-alkyl, or $C_1$–$C_4$-alkyl substitued by cyano, amino, carbamoyl, or carboxyl;

$R_6$ is hydrogen, chloro, bromo, or $C_1$–$C_4$-alkyl, $R_7$ is hydrogen, chloro, bromo, cyano, $C_1$–$C_4$-alkoxy, or $C_1$–$C_4$-alkyl;

X is $C_2$–$C_4$-alkylene, methylenephenyl, ethylenephenyl, phenylene, or phenylene substituted by $C_1$–$C_4$-alkyl, benzyl, phenyl, $C_1$–$C_4$-alkoxy, benzyloxy, chloro, bromo, cyano, or nitro;

Y is —$SO_3H$, or when X is phenylene or substituted phenylene, Y is —$SO_3H$ or —$SO_2$—NH—$SO_2$—$R_8$; and $R_8$ is $C_1$–$C_4$-alkyl, phenyl, dimethylamino or $C_1$–$C_4$-alkylphenyl.

2. Monoazo dyestuff of claim 1, which in the form of the free acid corresponds to the formula

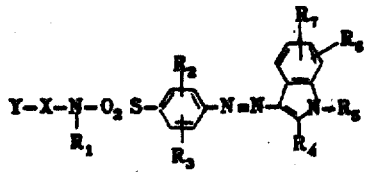

wherein
$R_1$, $R_2$, $R_3$, $R_4$, $R_5$, $R_6$, $R_7$, X and Y have the meaning mentioned in claim 1.

3. Monoazo dyestuff of claim 1 which in the form of the free acid corresponds to the formula

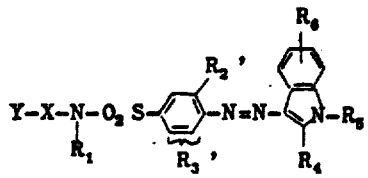

wherein
$R_1$, $R_4$, $R_5$, $R_6$, X and Y have the meaning mentioned in claim 1,
$R_2'$ = hydrogen, chloro or bromo and
$R_3'$ = chloro or bromo.

4. Monoazo dyestuff which in the form of the free acid corresponds to the formula

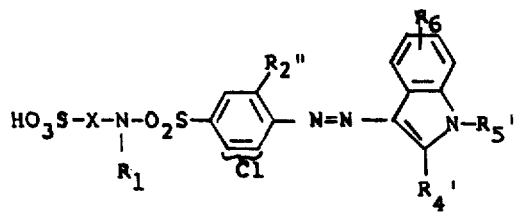

wherein
$R_1$ and X have the same definition as given in claim 1;
$R_2''$ is hydrogen or chloro;
$R_4'$ is $C_1$–$C_4$-alkyl or phenyl;
$R_5'$ is hydrogen, $C_1$–$C_4$-alkyl, or $C_1$–$C_4$-alkyl substituted by amino, cyano, carbonamido, or carboxyl; and
$R_6'$ is hydrogen, chloro, or $C_1$–$C_4$-alkyl.

* * * * *

UNITED STATES PATENT OFFICE
CERTIFICATE OF CORRECTION

Patent No. 3,891,619  Dated June 24, 1975

Inventor(s) RICHARD SOMMER et al

It is certified that error appears in the above-identified patent and that said Letters Patent are hereby corrected as shown below:

Column 1, line 59, '$C_2H_4CN$ should be --- -$C_2H_4CN$ ---.

"  "  -$C_2H_4COOCH$ should be --- -$C_2H_4COOH$ ---.

Column 2, line 10, delete "and -$CH_2$-$CG_2$-$CH_2$-$CH_2$- ---.

Column 2, lines 26-27, "$C_6H_5$-$CH$-$_2$-O-" should be ---$C_6H_5$-$CH_2$-O- ---

Column 3, line 6, "32" should be --- = ---.

Column 7, line 25, "2-methyl-5cyano" should be --- 2-methyl-5-cyano ---.

Column 7, line 28, "1$\beta$-" should be --- 1-$\beta$- ---.

Column 9, line 22, the last part of the formula should be

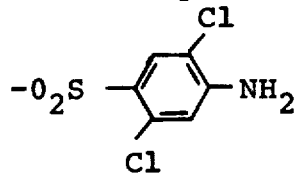

Column 13, line 67, the first part of the formula should be

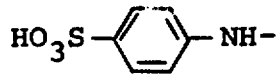

Column 15, line 119, -N-$C_2$S- should be --- -N-$O_2$S- ---.
              H                             H Column 15, line 121, -$O_2$S-⟨ ⟩-N-  should be  -$O_2$S-⟨ ⟩-N-
                              H                            H

UNITED STATES PATENT OFFICE
CERTIFICATE OF CORRECTION

Patent No. 3,891,619      Dated June 24, 1975

Inventor(s) RICHARD SOMMER et al

It is certified that error appears in the above-identified patent and that said Letters Patent are hereby corrected as shown below:

Column 17, line 122, the last part of the formula should be

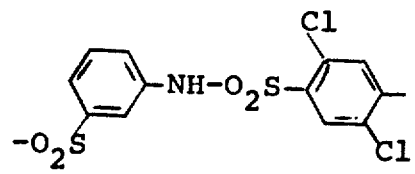

Column 17, line 124, 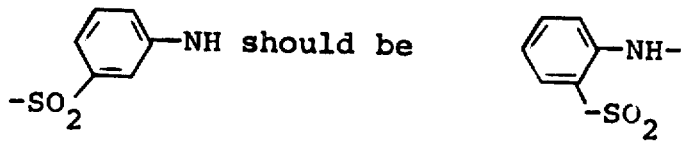

Column 17, line 128, should be same as above.

Column 17, line 131, ⟨⟩-NH should be ⟨⟩-NH-
                     -SO$_2$              -SO$_2$ Column 20, line 20, $R_6$ should be --- $R_6'$ ---.

Signed and Sealed this

First Day of November 1977

[SEAL]

Attest:

RUTH C. MASON            LUTRELLE F. PARKER
Attesting Officer        Acting Commissioner of Patents and Trademarks